(12) United States Patent
Lee et al.

(10) Patent No.: US 10,819,125 B2
(45) Date of Patent: Oct. 27, 2020

(54) WIRELESS CHARGER

(71) Applicant: JMTEK, LLC, Kent, WA (US)

(72) Inventors: Kyu Bong Lee, Auburn, WA (US); Quanxiong Li, Shenzhen (CN)

(73) Assignee: JMTEK, LLC, Kent, WA (US)

( * ) Notice: Subject to any disclaimer, the term of this patent is extended or adjusted under 35 U.S.C. 154(b) by 112 days.

(21) Appl. No.: 16/219,928

(22) Filed: Dec. 13, 2018

(65) Prior Publication Data

US 2019/0190283 A1 Jun. 20, 2019

(30) Foreign Application Priority Data

Dec. 13, 2017 (CN) .......................... 2017 3 0633468

(51) Int. Cl.
*H02J 7/00* (2006.01)
*H02J 50/10* (2016.01)
*H04M 1/04* (2006.01)
*H04B 1/3888* (2015.01)
*H02J 7/02* (2016.01)

(52) U.S. Cl.
CPC .............. *H02J 7/0027* (2013.01); *H02J 7/00* (2013.01); *H02J 7/0042* (2013.01); *H02J 7/025* (2013.01); *H02J 50/10* (2016.02); *H04B 1/3888* (2013.01); *H04M 1/04* (2013.01); *H02J 7/0044* (2013.01); *H02J 7/0045* (2013.01); *H02J 2310/22* (2020.01)

(58) Field of Classification Search
CPC .. H02J 7/00; H02J 50/10; H02J 7/0042; H02J 2310/22; H02J 7/0045; H02J 7/0044; H04M 1/04; H04B 1/3888
See application file for complete search history.

(56) References Cited

U.S. PATENT DOCUMENTS

| | | | | |
|---|---|---|---|---|
| 9,774,212 | B2* | 9/2017 | Wu | H02J 7/025 |
| 10,277,060 | B1* | 4/2019 | Cushing | H02J 50/10 |
| 10,283,998 | B2* | 5/2019 | Hong | H02J 50/10 |
| 2007/0085403 | A1* | 4/2007 | Crossman | A47C 7/54 |
| | | | | 297/411.38 |
| 2015/0097519 | A1* | 4/2015 | Chen | H02J 50/10 |
| | | | | 320/108 |
| 2015/0188356 | A1* | 7/2015 | Chen | H02J 7/025 |
| | | | | 320/108 |
| 2016/0105048 | A1* | 4/2016 | Lee | F16M 3/00 |
| | | | | 320/108 |
| 2017/0222680 | A1* | 8/2017 | Yan | H04B 1/3883 |

\* cited by examiner

*Primary Examiner* — Stacy Whitmore
(74) *Attorney, Agent, or Firm* — DWC Law Firm, P.S.

(57) ABSTRACT

A wireless charger having a base, an adjustable bracket and a housing slidably connected to the bracket, with the base being releasably connected to the bracket. In some embodiments, the wireless charger includes a button member that can be displaced to move a connector plate and in turn, compress a spring member, in order to disengage a locking member from the bracket so that the bracket can be slidably adjusted relative to the housing.

8 Claims, 10 Drawing Sheets

WIRELESS CHARGER

CROSS-REFERENCE TO RELATED APPLICATION(S)

This application claims priority to Chinese utility model application No. 201730633468.9, filed on Dec. 13, 2017, which is incorporated herein by reference in its entirety.

BACKGROUND

Technical Field

The present disclosure relates to wireless chargers, and in particular, wireless chargers for portable electronic devices, such as smartphones.

Description of Related Art

At present, with the increasing popularity of portable electronic devices such as mobile phones, many wireless chargers have appeared on the market. The industry has designed flat placement and vertical placement wireless chargers. For vertical placement wireless charges, the charger usually includes a charging body, a base and a support frame. One end of the support frame is connected to the base, and the other end is fixedly connected with the charging body to set the charging body. However, the height of the support frame is fixed, while the shape and size of different electronic products are different.

BRIEF SUMMARY

In some embodiments of the present disclosure a wireless charger comprises a base, releasably connected to an elongated bracket having a plurality of first adjustment portions disposed thereon in spaced apart fashion along a length of the bracket. A housing of the wireless charger contains a charging component, and the bracket extends into the housing with at least one of the plurality of first adjustment portions engaging a displaceable second adjustment portion within the housing to releasably lock the bracket relative to the housing. The bracket is slidable relative to the housing when the second adjustment portion (e.g., releasable locking member) is displaced.

In some embodiments, an internal fixing plate is fixedly connected a rear case element of the housing, within the housing, and a button member having a spring member is abutted against the fixing plate. The button member has a pressing portion and is also connected to or integral to the second adjustment portion, wherein when the pressing portion is pressed, the second adjustment portion is displaced to disengage a corresponding one of the first adjustment portions from the second adjustment portion while the spring member is simultaneously compressed against the fixing plate. Also, at least one elongated limiting plate extends lengthwise along at least a portion of the bracket within the housing, the limiting plate including a slot through which a connection plate of the button member extends, with the spring member being connected to the connection plate by a mounting post.

DETAILED DESCRIPTION

Figure 1:
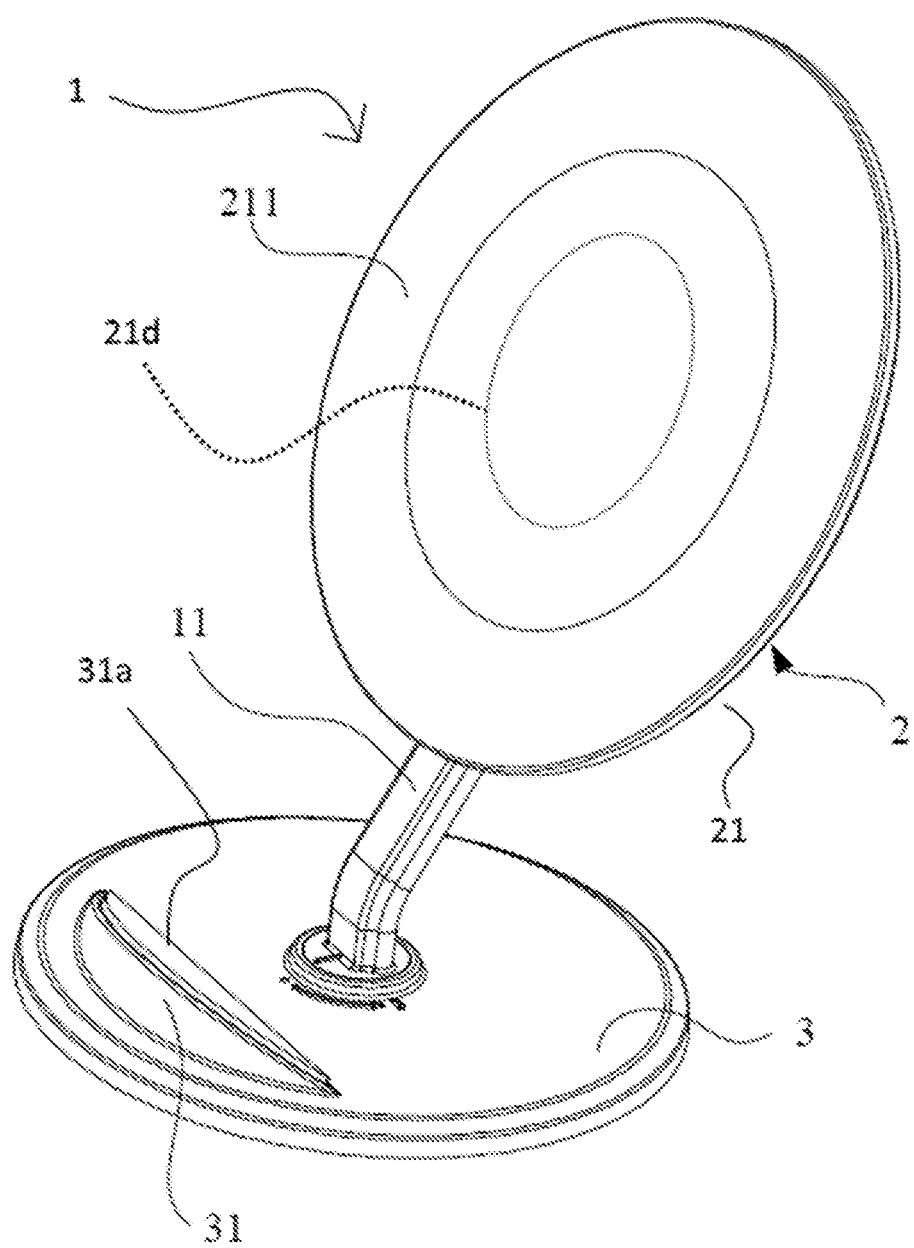
FIG. 1 is a front perspective view of an embodiment of the wireless charger of the present disclosure, with the bracket extended and the housing at a higher position relative to FIG. 2.

In the present description, certain specific details are set forth in order to provide a thorough understanding of various embodiments of the disclosure. However, upon reviewing this disclosure one skilled in the art will understand that the various embodiments disclosed herein may be practiced without many of these details.

In the present description, the terms "a" and "an" refer to "one or more" of the enumerated components. The use of the alternative (e.g., "or") should be understood to mean either one, both, or any combination thereof of the alternatives. As used herein, the terms "include," "comprise," and "have" are used synonymously, which terms and variants thereof are intended to be construed as non-limiting. In the present disclosure and in any appended materials, to the extent the terms "about" and "approximately" are used, they mean ±25% of the indicated range, value, or structure, unless otherwise indicated. The definitions in this paragraph are intended to apply throughout this disclosure unless otherwise expressly stated.

Various embodiments in this disclosure are described in the context of use with mobile smartphones and described as having a circular shaped case or housing, and circular shaped base. However, as will be appreciated by those skilled in the art after reviewing this disclosure, various other configurations may be suitable, which may be modified in the spirit of this disclosure for use with such mobile smartphones, or other electronic devices.

Referring to FIGS. 1-7, in some embodiments of the present disclosure, the wireless charger includes a base 3, a charging body 2, and a position adjustment mechanism (or system) 1. The charging body 2 includes a housing 21 (formed with a front case element 211, and a rear case element 212, enclosing a cavity 21a therebetween), and a wireless charging sensing component (not shown) disposed in the cavity 21a.

Figure 3:
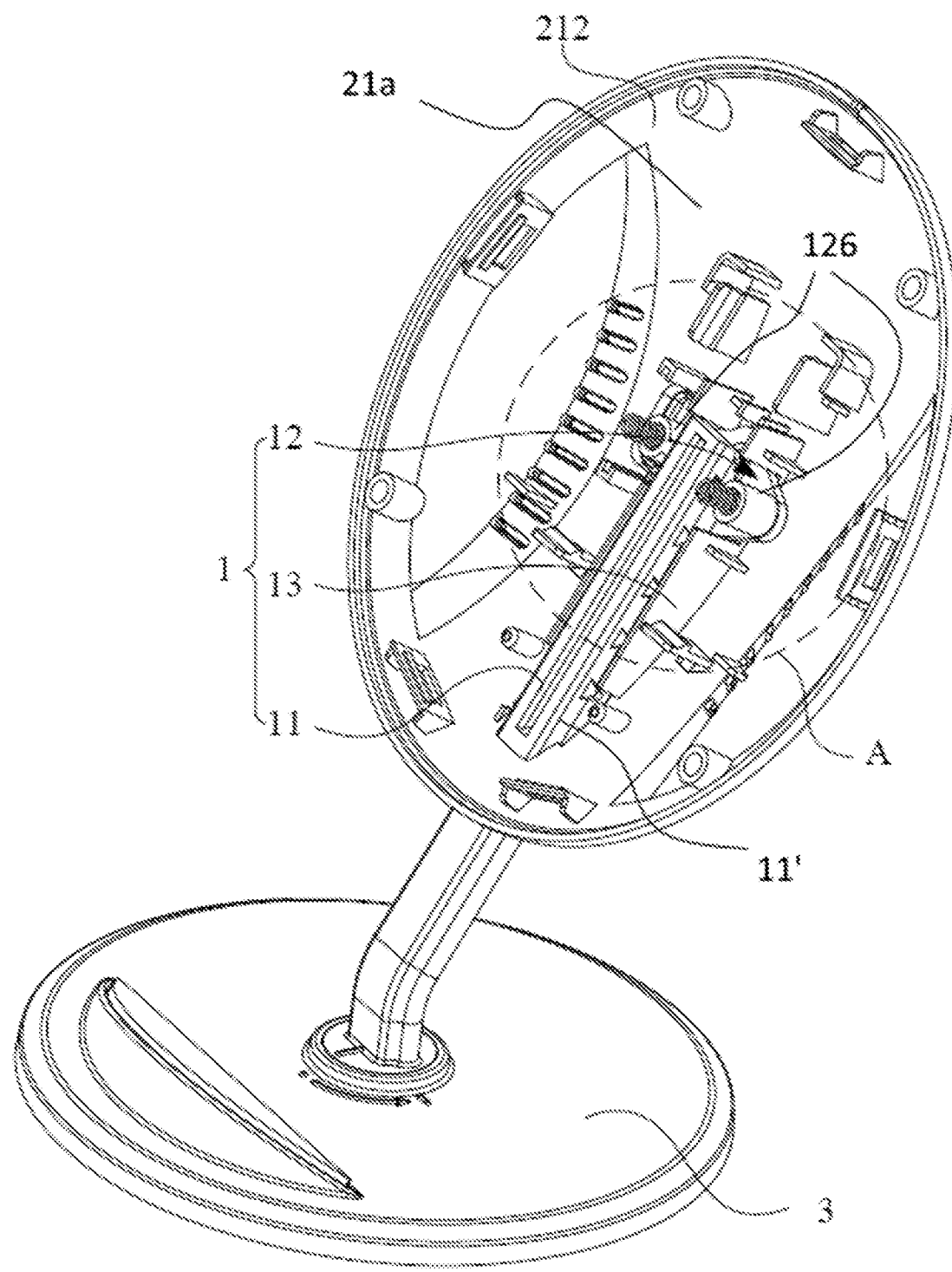
FIG. 3 is a front perspective view of the wireless charger of FIG. 1, with the front case element and fixing plate removed to expose the bracket adjustment system, including the limiting plate and button member components, and with the bracket adjusted relative to the housing to be fully extended, or partially extended, with the housing in a raised position.
Figure 4:
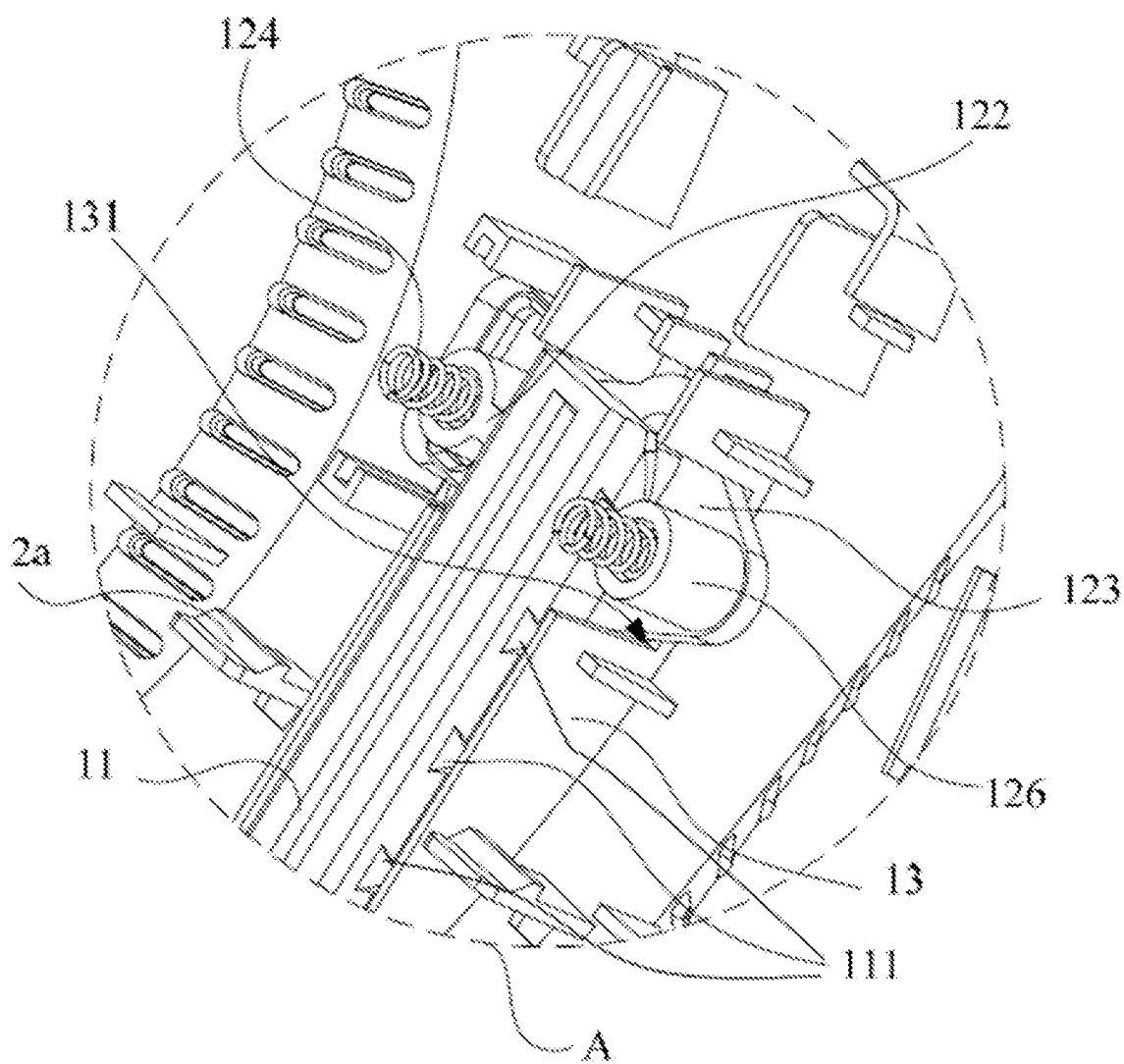
FIG. 4 is an enlarge view of portion A of FIG. 1.
Figure 5:
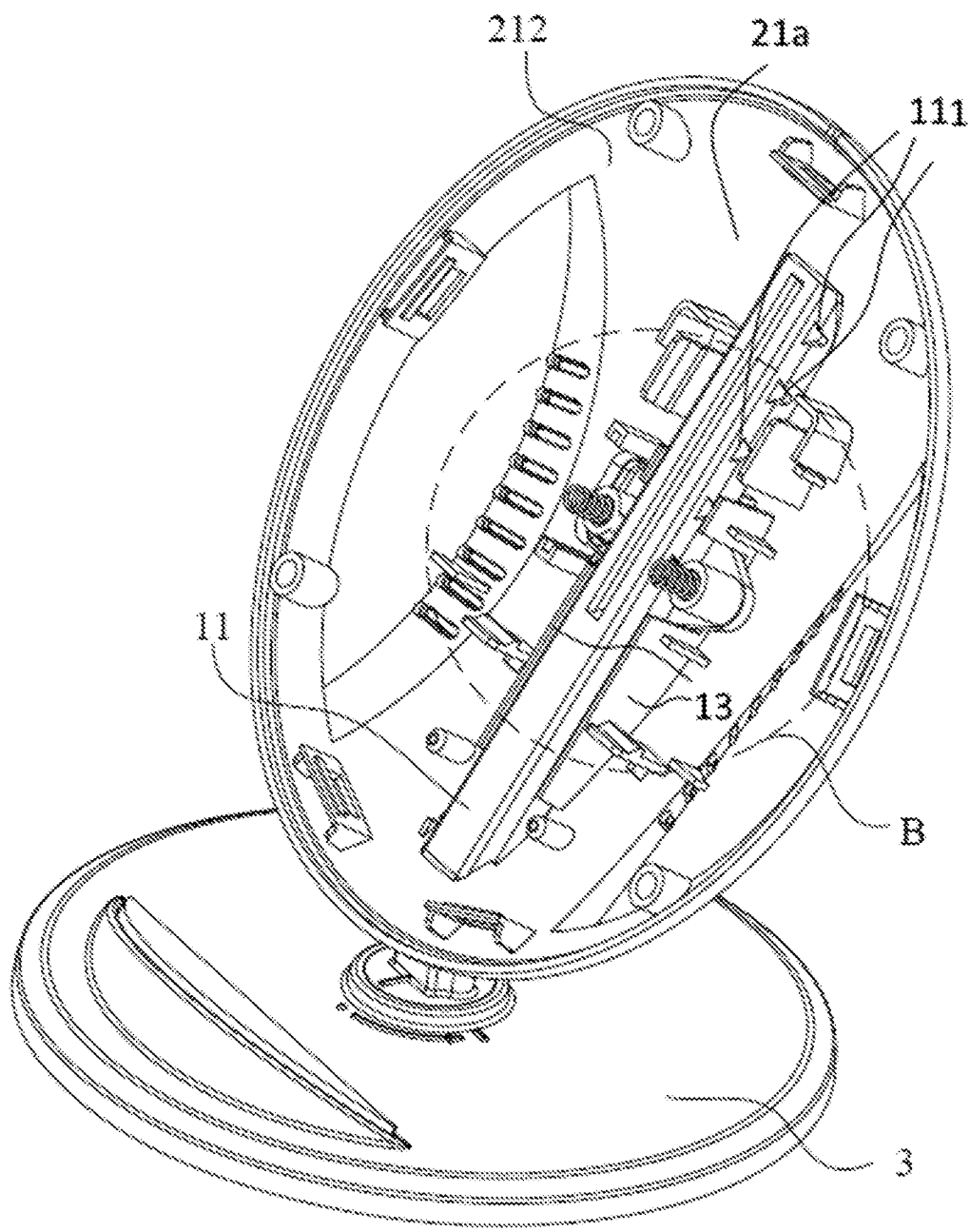
FIG. 5 is a front perspective view of the wireless charger of FIG. 1, with the front case element and fixing plate removed to expose the bracket adjustment system, including the limiting plate and button member components, and with the bracket adjusted relative to the housing to be fully retracted, or partially retracted, with the housing in a lowered position.
Figure 6:
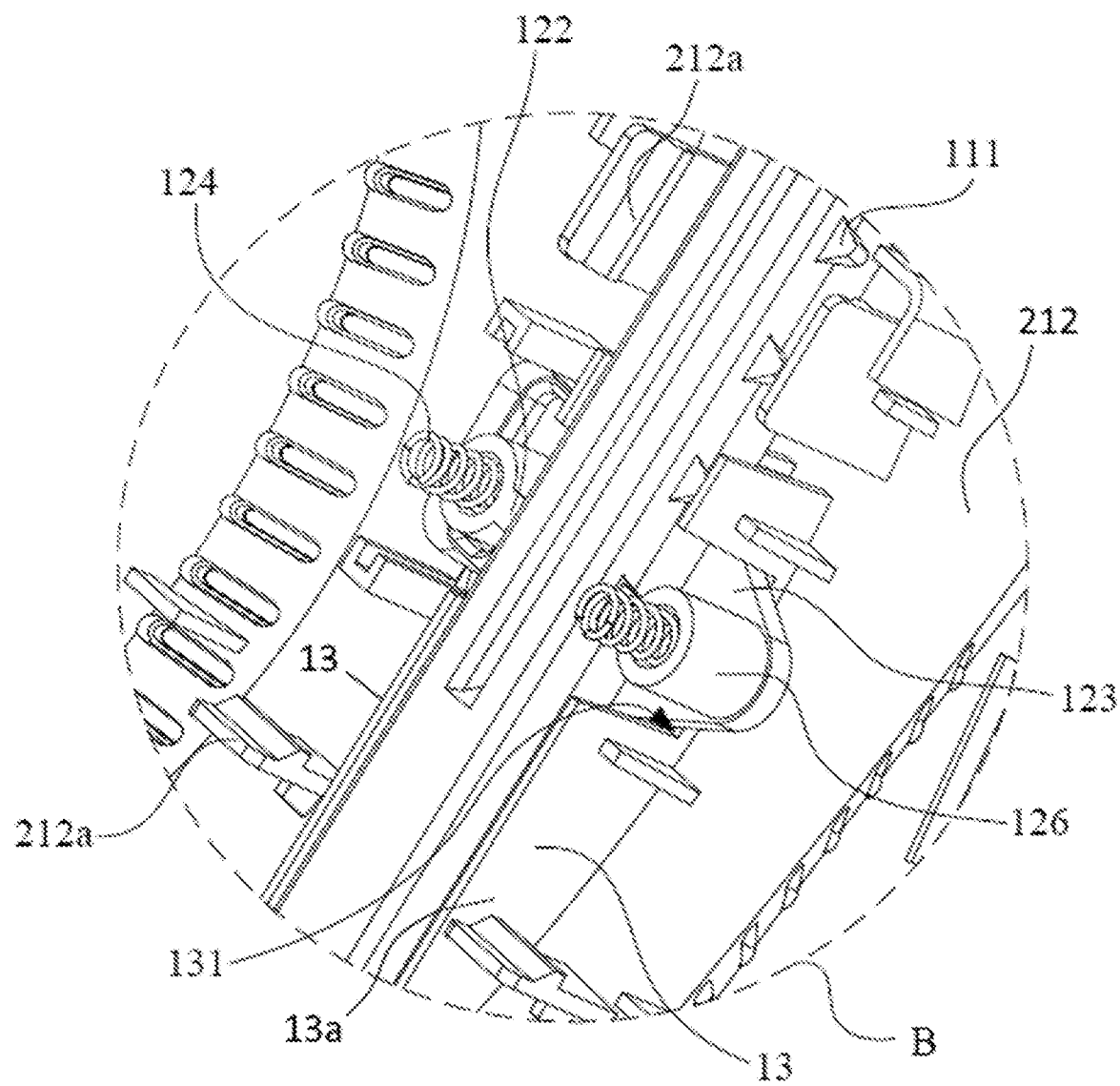
FIG. 6 is an enlarge view of portion B of FIG. 5.

Referring to FIG. 3, the position adjusting mechanism 1 includes an adjustment bracket 11 and an adjustment button member 12 (having a pressing portion 121), as well as a limiting plate 13. The lower end of the bracket 11 is selectively connectable to the base 3. The bracket 11 has an upper end portion 11' that protrudes into the inner cavity 21a, and the portion of the adjusting bracket 11 that protrudes into the inner cavity is provided with a plurality of first adjusting portions 111 positioned along its length, and the adjusting button 12 includes a pressing portion 121 movably connected to the rear case element 212. A second adjusting portion 122 (e.g., a releasable locking member for the bracket) is connected to the pressing portion 121 so as to be moved when the button member 12 is pressed by a user pressing the pressing portion. That is, the pressing portion 121 includes a pressed state (by being pressed inward toward the cavity 21a), and a pop-up state when the pressing portion 121 is not manually pressed, and the pressing portion 121 is biased outward or rearward of the rear case element 212 by one or more spring members 124 (or elastic parts). In the pop-up state, or resting state, the pressing portion 121 is "popped up", or extended furthest aware form the rear case element 212 rearwardly, and the second adjusting portion 122 is fitted and engaged with a first adjusting portion 111 on the bracket 11. Conversely, in the pressed state, the second second adjusting portion 122 is disconnected from any of the first adjusting portion 111, and the charging body 2 is disengaged from the first adjusting portions 111, so that different heights can be selected by moving the bracket 11 relative to the second adjusting portion 122 to adjust the vertical position, before allowing the pressing portion 121 to be release and again rest in the pop-up state or resting state.

Figure 2:
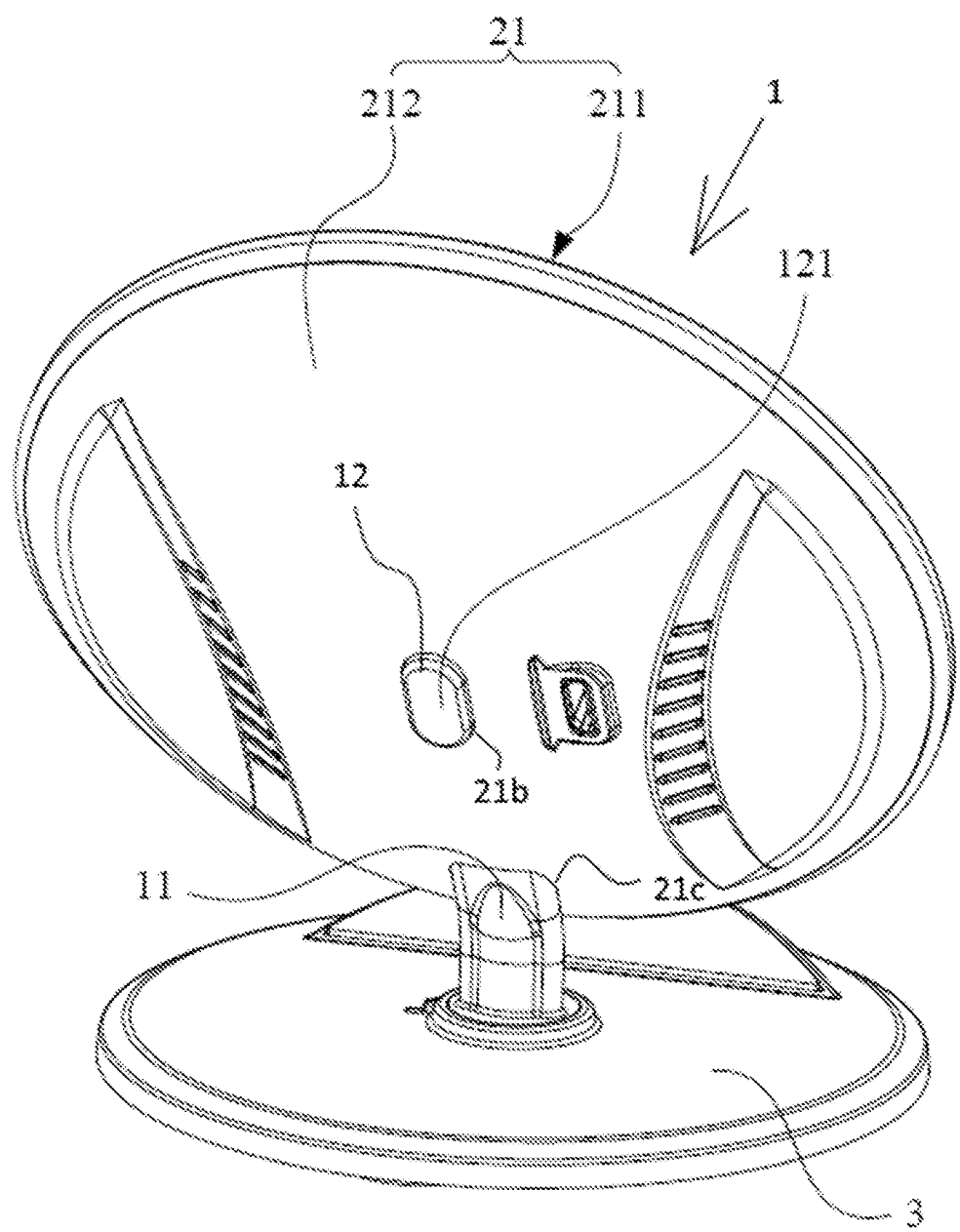
FIG. 2 is a rear perspective view of the wireless charger of FIG. 1, with the bracket retracted and the housing at a lower position.

Referring to FIGS. 1-3, in some embodiments, the housing 21 of the charging body 2 includes a front case element 211 and a rear case element 212, and the front case element 211 and the rear case element 212 are adapted to cover and form a cavity 21a therebetween. Specifically, the front case element 211 can be, for example, a circular cover plate (or other shape), and the rear case element 212 is a concave case having a rearwardly concave shape, concave in a directly extending away from the front case element 211, when mated thereto.

Referring to FIG. 2, a through hole or aperture 21b is provided in a middle portion of the rear case element 212, and the pressing portion 121 of the adjustment button 12 passes through the through hole and may protrude from the outer rear surface of the rear case element 212 (as best seen in FIG. 2), and the other portion of the adjustment button member 12 within the cavity 21a, positioned proximate the inner side surface of the rear case 212.

A lower end portion of the rear case 212 is also provided with lower through hole or aperture 21c and an upper portion of the adjustment bracket 11 is inserted into the inner cavity 21a from the outside the case element 212, through the lower aperture 21c, and extended upward into the cavity 21a until the bracket 11 engages the second adjusting portions 122 via the first adjusting portions 111 of the bracket. In some embodiments, the first adjustment portions 111 are notches formed on along the bracket in space apart positions, while the second adjustment portions 122 are stub members that can rest within the notches to stabilize the bracket 11 from moving upward or down. As such, then the pressing portion 121 is pressed, the second adjustment portions 122 are pressed inward (or forward relative to the housing and front case element) out of the first adjustment portions 111 (notches), and the bracket 11 is free to slide up or down relative to the housing 21 for adjusting the housing relative to the base 3, and when the pressing portion 121 is not pressed, and is in the resting state, the spring members 124 bias the second adjustment portions 122 rearward back into the a set of corresponding first adjustment portions 111 (notches) to stabilize the bracket 11 and hold it in a position, effectively fixing the housing 21 at a selected height relative to the base 3, as well be appreciated by those skilled in the art after reviewing this disclosure. Thus, the function provided by the present disclosure of adjusting bracket 11 vertically, to support the casing 21 (or housing) at user selected heights, provides a solution to fit differently sized electronically devices for adjusting the charging component 21d within a housing of wireless charging device by adjusting the height of the device.

Referring to FIG. 1, in some embodiments, the base 3 is arranged in a circular shape, and on the upper surface of the base 3, in front of the charging body 2, a slopped rest member 31, having a slopped resting surface 31a, which is rearwardly downwardly slopped, so that a bottom portion of a smart device, such as a mobile phone, can be rested against the slopped resting surface, with the phone extending vertically upward but slightly tilted toward the front case element 211, to rest against the housing 21, proximate a wireless charging component within the housing, as will be appreciated by those skilled in the art after reviewing this disclosure.

Figure 8:
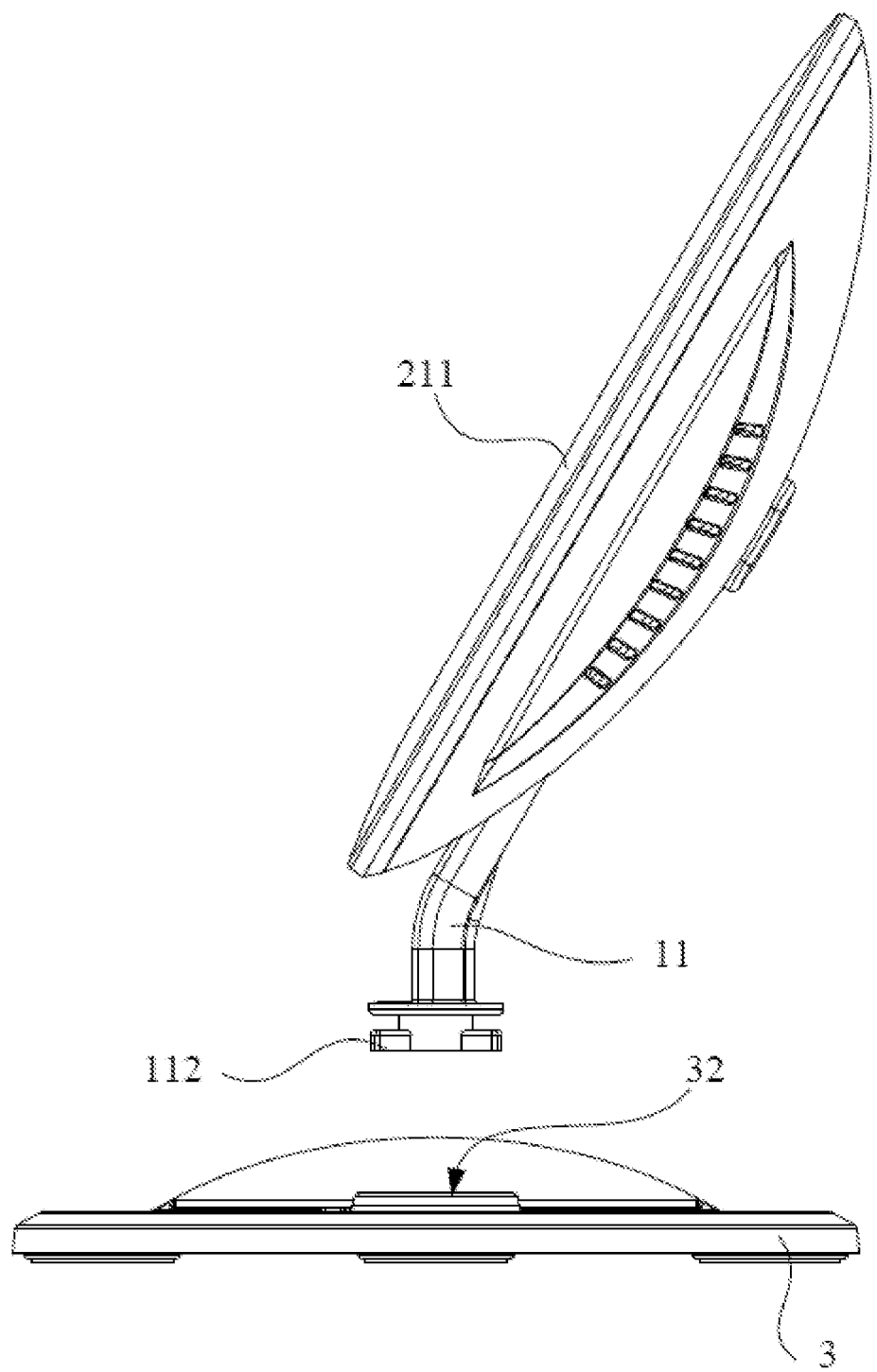
FIG. 8 is a side elevation view of the wireless charger of FIG. 1, with the bracket removed from the base connection socket.
Figure 9:
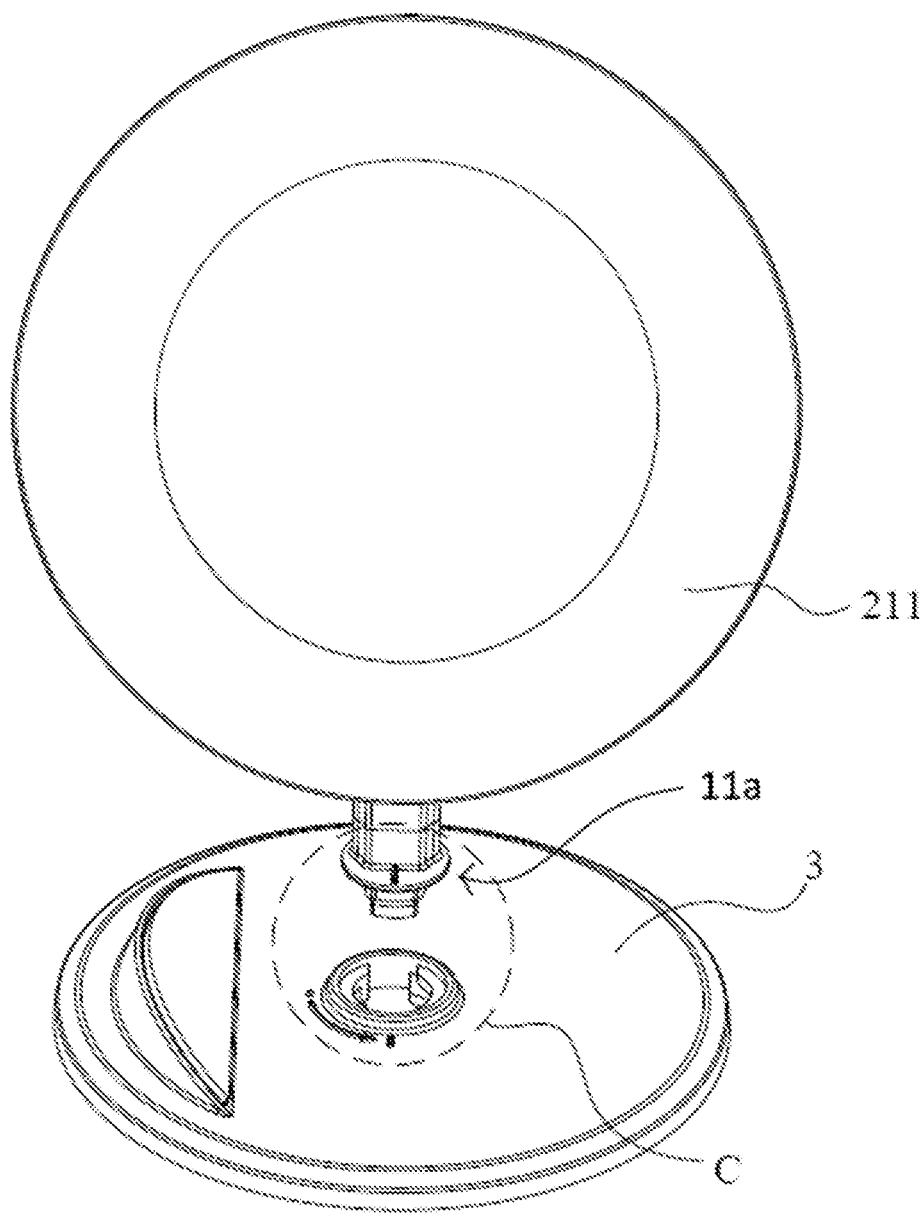
FIG. 9 is a front perspective view of the wireless charger of FIG. 1, with the bracket removed from the base connection socket.
Figure 10:
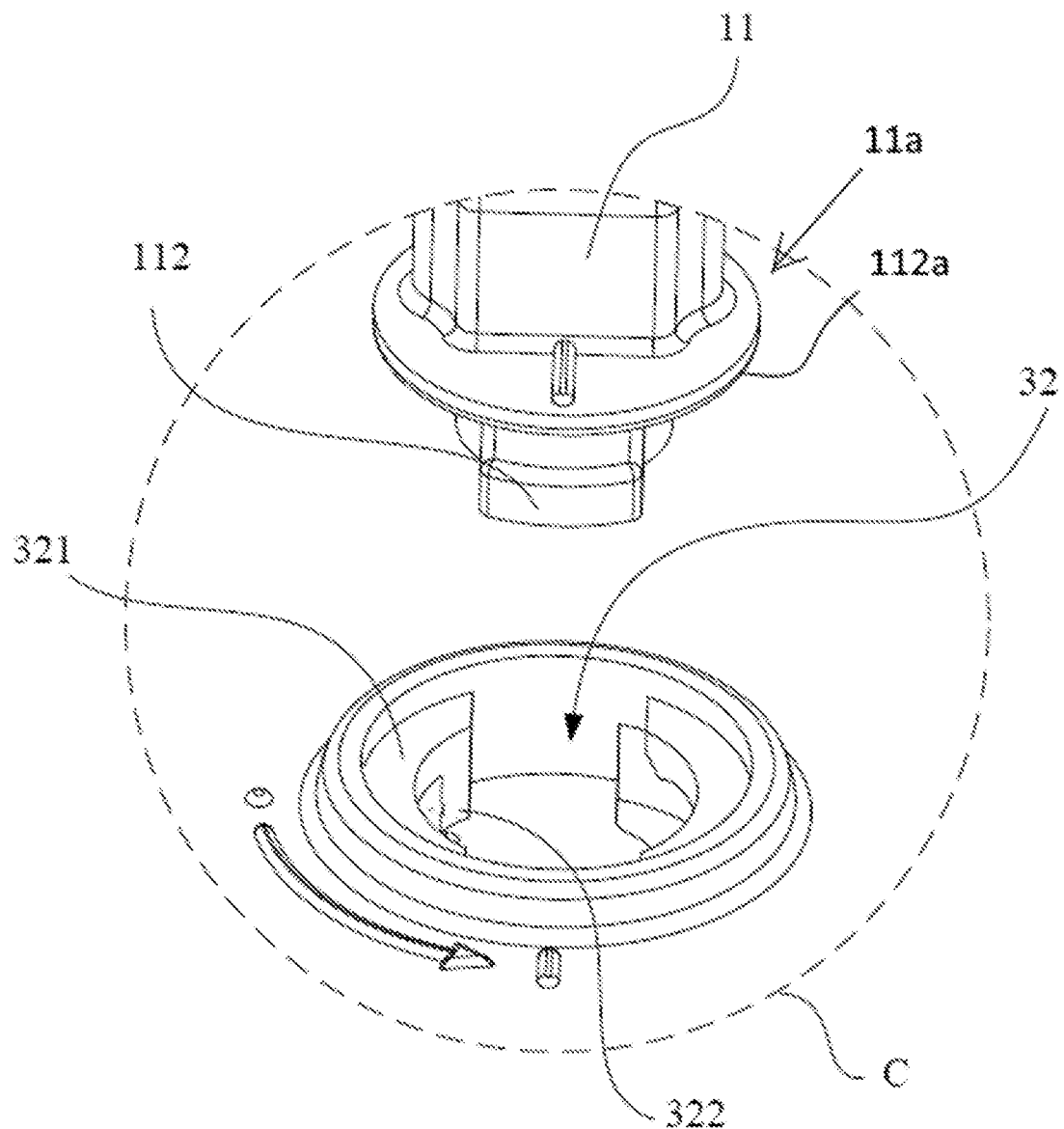
FIG. 10 is an enlarge view of portion C of FIG. 5.

In addition, referring to FIG. 8 to FIG. 10, in order to facilitate the quick disassembly and assembly between the bracket 11 and the base 3, the base 3 is provided with a connecting socket 32 for inserting the lower end 11a of the adjusting bracket 11. The lower end 11a is provided with one or more locking protrusions 112. The inner wall of the connecting socket 32 is convexly provided with a semi-annular shaped block 321. Specifically, the connecting socket 32 is circular in shape, and two spaced apart semi-annular blocks 321 are symmetrically disposed on the inner wall of the connecting socket 32. Correspondingly, two limit positions are symmetrically protruded circumferentially at the lower end of the adjusting bracket 11. The locking protrusion 112 and the spacing distance between the two blocks 321 should be greater than or equal to the width of the locking protrusion 112. In the actual installation, the adjusting bracket 11 lower portion 11a is inserted into the socket 32, with the protrusion 112 inserted vertically between spaced between the semi-annular blocks 321, and then twisted to allow the blocks 321 to slide horizontally between the protrusion 112 (there may be a plurality of protrusions 112), and a sealing plate 112a above the protrusions 112. In some embodiments, the adjustment bracket 11 is twisted/rotated by 90 degrees until the protrusion 112 abuts against a stop member 322, but the semi-annular blocks are snugly retained between the protrusions 112 and sealing plate 112a, to stably retain the bracket 11 against the base 3 in substantially vertically oriented position, until a user wishes to disassemble the bracket 11 from the base 3. For disassembly, in some embodiments, a user can simply twist the bracket 11 in opposite direction from assembly, and the bracket 11 will release from the socket 32 and base, as well be appreciated by those skilled in the art.

Referring to FIGS. 3-6, in some embodiment, the position adjusting mechanism 1 further includes two oppositely disposed limiting plates 13. The two limiting plates 13 are protruded from the inner side surface of the rear case element 212 and have a length. The limiting plates 13 extend in the up and down direction (lengthwise along the rear case element 212) to form a limit chute 13a within which an upper portion 11' of the bracket 11 can slidably rest, for sliding the adjusting bracket 11 up and down within a predetermined track. The positioning plates 13 are also each provided with a positioning slot 131, and a connecting plate 123 integral with or connected as part of the button member 12, is positioned within each of the pair of slots 131, such that the positioning slot 131 can restrict the connecting plate 123 from being displaced upwardly, downwardly, or in a left or right direction, to help stabilize the button member 12. The connecting plates 123 are formed with, or connected to, mounting post 126, within which are mounted rearward portions of the spring members 124 (See, FIG. 4).

Figure 7:
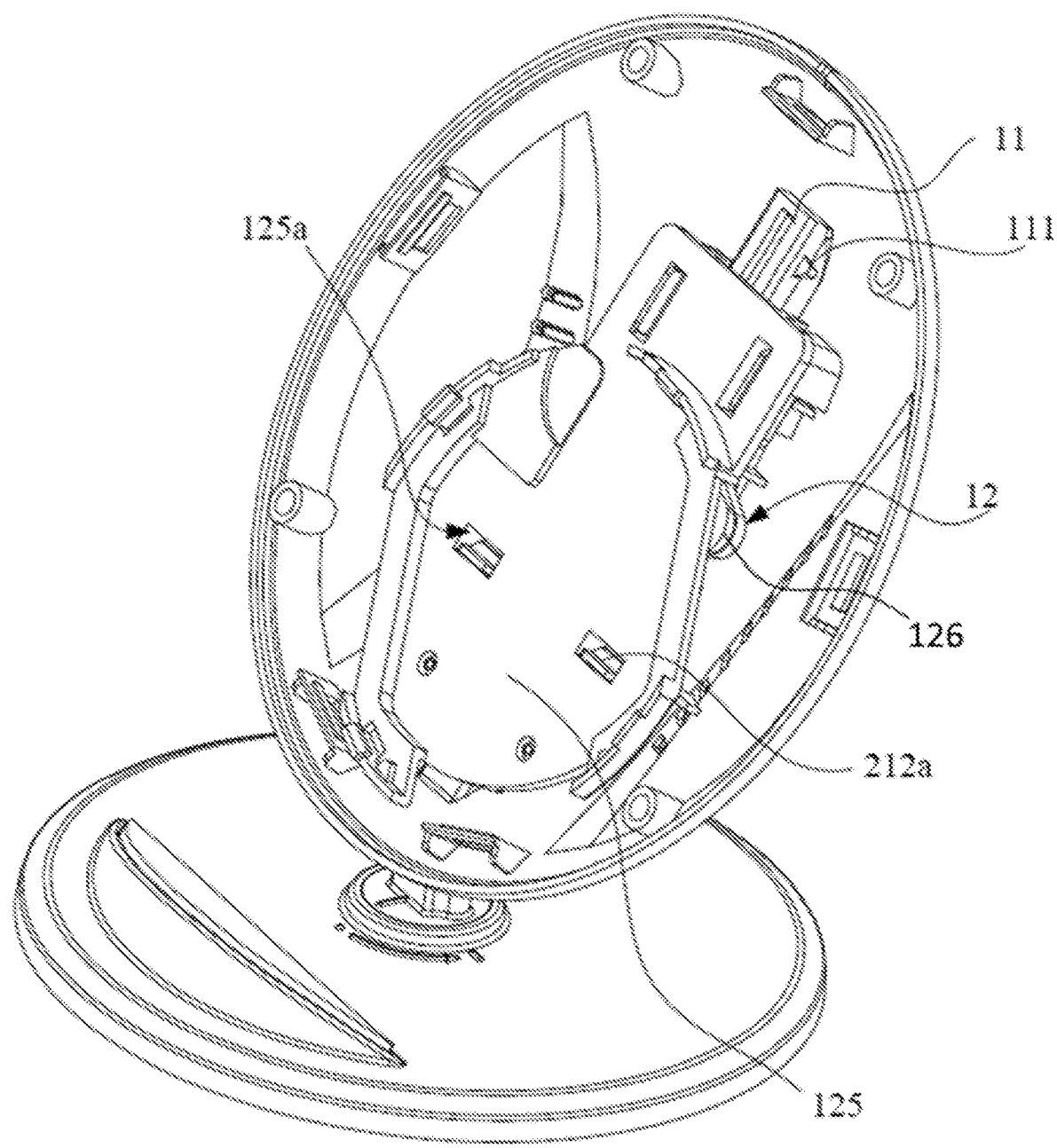
FIG. 7 is a front perspective view of the wireless charger of FIG. 1, with the front case element removed to expose the fixing plate.

Referring to FIG. 7, in some embodiments, the fixing plate or member 125 is fixedly disposed in front of the adjusting bracket 11, and the fixing plate is detachably connected to the inner side surface of the rear case element 212. A forward portion of the spring members 124 are abutted, biased, against a rearwardly facing surface of fixing plate 125, such that the fixing plate covers the spring members 124 as viewed from a front side thereof, such as shown in FIG. 7. Here, the provision of the fixing plate can be used not only to abut against the elastic member (spring members) 124, but also to limit the displacement of the button member 12 (and all of its parts, including the mounting posts, connector plate 123, etc) to move forward, and also to cover and protect the components such as the adjustment bracket 11 and the adjustment button 12 therein.

In some embodiments, a plurality of latching holes 125a are formed through the fixing plate on both sides of the adjusting bracket 11, and a buckle member 212a that fits and engages with the latching hole 125a is protruded from the inner side surface of the rear case element 212, to help retain the fixing plate. Specifically, the inner side of the rear cover 212 is provided with two spaced apart hooks 212a (or buckle members) on the left and right sides of the two limiting plates 13, and the hooks 212a protrude through the latching holes 125 and engage perimeter wall edges thereof to grip the fixing plate 125 and hold it fixedly in position relative to the rear case element 212 and housing 21. The fixing plate also provides a surface upon which wireless charging components can be mounted, as will be appreciated by those skilled in the art after reviewing this disclosure. In some embodiments, a charging component and enabling parts therefore are fully or partially mounted to the fixing plate.

In some embodiments, a user can adjust the assembled wireless charger 1 shown in FIGS. 1 and 2, by pressing the pressing portion 121 of the button 12 inward, toward the rear case element 212, which in turn, causes the mounting posts 126 to displace toward the fixing plate 125, compressing the springs 124 abutted against the fixing plate, and also displaces the second adjusting portions 122 (e.g., stubs) on the button member 12 inward, to release the second adjusting portions 122 from corresponding first adjusting portions 111 (e.g., notches or grooves) in which they are engaged at a selected location along the bracket 11 within the housing 21. This allows the bracket 11 to be slidably adjusted within the limiting plates 13, so that the housing 21 can slide from a raised position (e.g., as shown in FIG. 1), to a lowered position (e.g., as shown in FIG. 2), or vice versa. When releases the pressing portion 121, the spring members 124 bias the mounting post 126 rearward, which in turn, displaces the second adjusting portions 122 rearward, to engage corresponding first adjusting portions 111 at a location along the length of the bracket 11 to which the bracket 11 has been adjusted, to selectably releasably lock the bracket 11 in position relative to the housing 21. Also, in some embodiments, a user can disassemble the wireless charger by twisting the bracket 11 relative to the base 3 to release it from the connector socket 32 as previously described in relation to FIGS. 8-10.

After reviewing the present disclosure, an individual of ordinary skill in art will appreciate that some details and features can be added, removed and/or changed without deviating from the spirit of the invention. Reference throughout this specification to "one embodiment," "an embodiment," "additional embodiment(s)" or "some embodiments," or variations thereof, means that a particular feature, structure or characteristic described in connection with the embodiment(s) is included in at least one or some embodiment(s), but not necessarily all embodiments, such that the references do not necessarily refer to the same embodiment(s). Furthermore, the particular features, structures, or characteristics may be combined in any suitable manner in one or more embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

What is claimed is:

1. A wireless charger comprising:
   a base;
   an elongated bracket having a plurality of first adjustment portions disposed thereon in spaced apart fashion along a length of the bracket; and
   a housing containing a charging component, wherein the bracket extends into the housing with at least one of the plurality of first adjustment portions engaging a displaceable second adjustment portion within the housing to releasably lock the bracket relative to the housing, and wherein the bracket is slidable relative to the housing when the second adjustment portion is displaced;
   wherein the bracket is releasably connected to the base; and
   wherein the base includes a socket for receiving the bracket, and wherein the socket includes one or more semi-annular members for engaging one or more protrusion members directly on the bracket.

2. The wireless charger of claim 1 further comprising at least one limiting plate disposed within the housing, the limiting plate extending along a portion of the length of the bracket within the housing.

3. The wireless charger of claim 2 further comprising at least a second limiting plate,
   with the bracket disposed between the first limiting plate and the second limiting plate.

4. A wireless charger comprising:
   a base;
   an elongated bracket having a plurality of first adjustment portions disposed thereon in spaced apart fashion along a length of the bracket;
   a housing containing a charging component, wherein the bracket extends into the housing with at least one of the plurality of first adjustment portions engaging a displaceable second adjustment portion within the housing to releasably lock the bracket relative to the housing, and wherein the bracket is slidable relative to the housing when the second adjustment portion is displaced; and
   a pressing portion connected to the second adjustment portion, and a spring member also connected to the pressing portion, wherein applying pressure on the pressing portion compresses the spring member against an internal fixing plate that is fixedly disposed within the housing and displaces the second adjustment portion, and wherein when the pressure is released from the pressing portion the spring member biases the pressing portion back to a resting position and simultaneously biases the second adjustment portion to cause it to engage at least one of the plurality of first adjustment portions.

5. A wireless charger comprising:

a base;

an elongated bracket having a plurality of first adjustment portions disposed thereon in spaced apart fashion along a length of the bracket;

a housing containing a charging component, wherein the bracket extends into the housing with at least one of the plurality of first adjustment portions engaging a displaceable second adjustment portion within the housing to releasably lock the bracket relative to the housing, and wherein the bracket is slidable relative to the housing when the second adjustment portion is displaced; and an internal fixing plate fixedly connected a rear case element of the housing, and a button member having a spring member abutted against the fixing plate, the button member having a pressing portion and also being connected to or integral to the second adjustment portion, wherein when the pressing portion is pressed, the second adjustment portion is displaced to disengage a corresponding one of the first adjustment portions while the spring member is simultaneously compressed against the fixing plate.

6. The wireless charger of claim 5 further comprising at least one elongated limiting plate extending lengthwise along at least a portion of the bracket within the housing, the limiting plate including a slot through which a connection plate of the button member extends, with the spring member being connected to the connection plate by a mounting post.

7. A method of operating a wireless charger comprising:

pressing a pressing portion on a button member of the wireless charger to release a slidable bracket thereof from a locked position relative to a housing containing a charging component;

sliding the slidable bracket relative to the housing; and releasing the pressing portion to allow a spring member to bias a second adjustment member to engage the bracket to releasably lock the bracket relative to the housing;

wherein the bracket having a first adjustment member and one or more other first adjustment members disposed thereon in spaced apart fashion along a length of the slidable bracket;

wherein the bracket extends into the housing with the first adjustment member for engaging the second adjustment member within the housing to releasably lock the bracket relative to the housing, and wherein the bracket is slidable relative to the housing when the second adjustment member is displaced;

wherein the pressing portion is connected to the second adjustment member, and the spring member also connected to the pressing portion, wherein applying pressure on the pressing portion compresses the spring member against an internal fixing plate that is fixedly disposed within the housing and displaces the second adjustment member, and wherein when the pressure is released from the pressing portion the spring member biases the pressing portion back to a resting position and simultaneously biases the second adjustment member to cause it to engage the first adjustment member.

8. The method of claim 7 further comprising disconnecting the bracket from a base of the wireless charger for storage, and reconnecting the bracket to the base by inserting the bracket into a socket on the base.

\* \* \* \* \*